US005933338A

United States Patent [19]
Wallace

[11] Patent Number: 5,933,338
[45] Date of Patent: Aug. 3, 1999

[54] DUAL COUPLED CURRENT DOUBLER RECTIFICATION CIRCUIT

[75] Inventor: Kenneth Andrew Wallace, Lewis Center, Ohio

[73] Assignee: Peco II, Inc., Galion, Ohio

[21] Appl. No.: 08/949,874

[22] Filed: Oct. 14, 1997

[51] Int. Cl.⁶ ............................................. H02M 3/18
[52] U.S. Cl. ............................. 363/61; 363/68; 363/69
[58] Field of Search .......................... 363/61, 68, 69, 363/126

[56] References Cited

U.S. PATENT DOCUMENTS

| | | | |
|---|---|---|---|
| 3,936,719 | 2/1976 | Miyoshi et al. | 321/2 |
| 4,019,111 | 4/1977 | Bennefeld | 320/23 |
| 4,316,125 | 2/1982 | Noguchi | 315/241 R |
| 4,400,630 | 8/1983 | Owen | 307/219.1 |
| 4,437,147 | 3/1984 | Takamura et al. | 363/61 |
| 4,445,166 | 4/1984 | Berglund et al. | 363/48 |
| 4,626,981 | 12/1986 | Su et al. | 363/62 |
| 4,660,136 | 4/1987 | Montorefano | 363/15 |
| 4,660,139 | 4/1987 | Nellen et al. | 363/68 |
| 4,860,187 | 8/1989 | Thompson | 363/61 |
| 4,899,271 | 2/1990 | Seiersen | 363/126 |
| 4,937,731 | 6/1990 | Konopka | 363/143 |
| 5,003,141 | 3/1991 | Braunisch et al. | 219/10.55 B |
| 5,119,283 | 6/1992 | Steigerwald et al. | 363/37 |
| 5,119,284 | 6/1992 | Fisher et al. | 363/48 |
| 5,153,453 | 10/1992 | Walters | 307/317.1 |
| 5,363,286 | 11/1994 | Tsuchiya | 363/8 |
| 5,371,454 | 12/1994 | Marek | 320/15 |
| 5,398,182 | 3/1995 | Crosby | 363/89 |
| 5,461,297 | 10/1995 | Crawford | 320/1 |
| 5,532,917 | 7/1996 | Hung | 363/67 |
| 5,544,038 | 8/1996 | Fisher et al. | 363/147 |
| 5,742,490 | 4/1998 | Bhagwat et al. | 363/17 |

OTHER PUBLICATIONS

Nasser H. Kutkut, A Full Bridge Soft Switched Telecom Power Supply with a Current Doubler Rectifier, *Intelec* '97 Melbourne, Australia, Oct. 1997, pp. 344–351.

O'Mera, Kevin, A New Output Rectifier Configuration Optimized for High Frequency Operation, High Frequency Power Conversion (HFPC) Conference Proceedings, Jun. 1991, pp. 219–225.

Peng, C., M. Hannigan et al., A New Efficient High Frequency Rectifier Circuit, High Frequency Power Conversion (HFPC) Conference Proceedings, Jun. 1991, pp. 236–243.

Cook, Arthur, Elements of Electrical Engineering, John Wiley and Sons, 1924, pp. 476–478.

Hausmann, Erich, Swoope's Lessons in Practical Electricity, Van Nostrand, 17$^{th}$ Edition, 1926 pp. 546–549.

Dawes, Chester L., A Course in Electrical Engineering, vol. II, McGraw–Hill, 1934, pp. 568–570.

Loew, E. A., Direct and Alternating Currents, McGraw–Hill 3$^{rd}$ Edition, 1946, pp. 695–699.

Dawes, Chester L., ibid, 4$^{th}$ Edition, 1947, pp. 570–571.

Eastman, Austin V., Fundamentals of Vacuum Tubes, McGraw–Hill, 3$^{rd}$ Edition, 1949, pp. 211–214.

Gray, Truman S., Applied Electronics, Mit Technology press, John Wiley and Sons, 2$^{nd}$ Edition, 1954, p. 361.

Hund, Aug., Phenomena in High–Frequency Systems, Mc–Graw–Hill, 1$^{st}$ Edition, 1936, pp. 174–177.

*Primary Examiner*—Shawn Riley
*Attorney, Agent, or Firm*—Marshall, O'Toole, Gerstein, Murray & Borun

[57] ABSTRACT

A rectifying circuit comprising first and second current doublers is disclosed. In some embodiments, the first and second current doublers are connected in series. In other embodiments, the current doublers are connected in parallel. In phase pairs of inductors can share a common core to reduce parts and ensure voltage balance.

18 Claims, 1 Drawing Sheet

DUAL COUPLED CURRENT DOUBLER RECTIFICATION CIRCUIT

FIELD OF THE INVENTION

The present invention relates generally to rectifying circuits and, more particularly, to a rectifying circuit employing dual coupled current doublers.

BACKGROUND OF THE INVENTION

It is often desirable to use high frequency switchmode battery chargers in telecommunications applications. Such battery chargers typically include a transformer for stepping an ac source voltage to an appropriate level, and a rectifying circuit for converting the power signal on the secondary side of the transformer to direct current. The rectifying circuits in these chargers typically employ diodes for rectification.

Schottky diodes have certain inherent characteristics that make those devices attractive for rectification applications. For example, Schottky diodes typically exhibit a low forward voltage drop and a fast reverse recovery time. The low forward drop characteristic would be advantageous in a rectification circuit for a battery charger or the like as the circuit would typically enjoy a greater power throughput. The fast reverse recovery characteristic would also be advantageous in high frequency switchmode chargers from a power throughput perspective.

Unfortunately, many telecommunications applications require significant output voltages; often on the order of 48 volts dc. The limited peak inverse voltage characteristic of Schottky diodes has, in the past, typically precluded their use in rectification circuits operating at such voltage levels.

Some prior art approaches to rectification in high frequency switchmode battery chargers have employed rectification circuits using inductors and diodes on the secondary side of a center-tapped transformer. These approaches have suffered from certain disadvantages. For example, the center-tap approach produces a half-cycle secondary current. Thus, such approaches do not utilize the transformer efficiently, and require a larger, and typically more expensive, transformer to produce a secondary current at a level near that produced by a smaller transformer producing a full wave secondary current.

SUMMARY OF THE INVENTION

The present invention overcomes the drawbacks associated with the prior art by providing a rectifying circuit for use in a battery charger having a transformer with a primary and two secondary windings. The rectifying circuit comprises: a first current doubling circuit connected to a first one of the secondary windings of the transformer; and, a second current doubling circuit connected to a second one of the secondary windings of the transformer. In certain embodiments, the first and second current doubling circuits are connected in series. In other embodiments, the first and second current doubling circuits are connected in parallel.

In any of the foregoing embodiments, the first current doubling circuit may comprise a first inductor and a first diode connected to a first terminal of the first secondary winding, and a second inductor and a second diode connected to a second terminal of the first secondary winding.

In any of the foregoing embodiments, the second current doubling circuit may comprise a third inductor and a third diode connected to a first terminal of the second secondary winding, and a fourth inductor and a fourth diode connected to a second terminal of the second secondary winding. In some embodiments, the first and third inductors may use a common core and/or the second and fourth inductors may use a common core.

In the preferred embodiments, the first, second, third, and fourth diodes comprise Schottky diodes.

DESCRIPTION OF THE PREFERRED EMBODIMENTS

Figure 1:
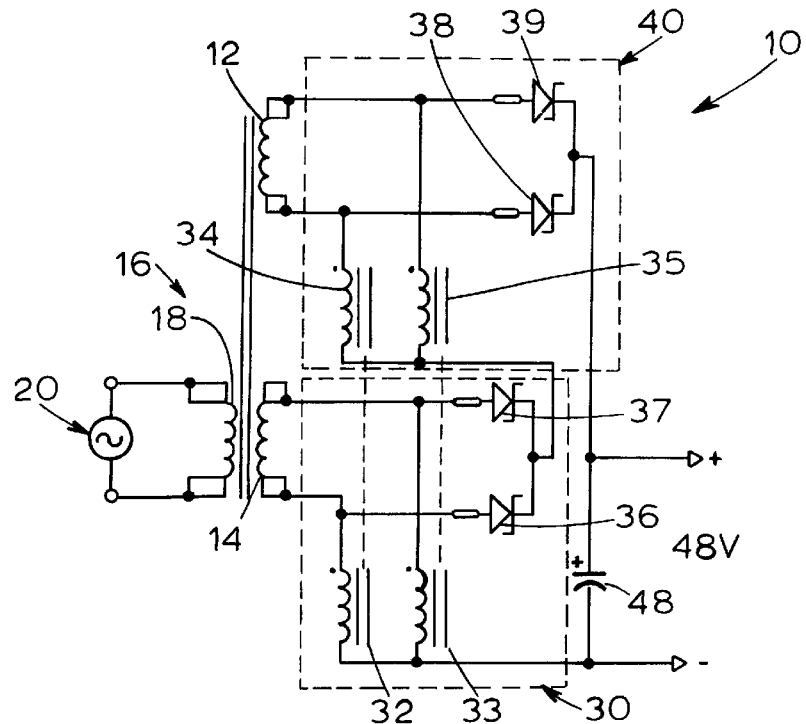
FIG. 1 is a schematic illustration of a rectifying circuit constructed in accordance with the teachings of the instant invention.

A rectifying circuit 10 constructed in accordance with the teachings of the instant invention is illustrated in FIG. 1. Although the disclosed rectifying circuit 10 is particularly well suited for use in a high frequency switchmode battery charger in a telecommunications application, persons of ordinary skill in the art will appreciate that the circuit 10 is not limited to use in any particular application or setting. On the contrary, circuits constructed in accordance with the teachings of the invention may be used in any application which would benefit from the advantages they offer without departing from the scope or spirit of the invention.

As shown in FIG. 1, the rectifying circuit 10 is adapted for coupling to the secondary windings 12, 14 of a transformer 16. The primary winding 18 of the transformer 16 is coupled, directly or indirectly, to an ac source 20. The source 20 can be of any conventional design. For example, in a typical telecommunication setting, it may comprise a 380 volt ZVS bridge. Similarly, the transformer 16 can be of any conventional design, but will preferably include a high frequency ferrite core structure and two substantially identical secondary windings 12, 14.

In accordance with an important aspect of the invention, the rectifying circuit 10 comprises two current doubler circuits 30, 40. In the preferred embodiment, the current doublers 30, 40 are substantially identical and will be treated as such in the following. However, persons of ordinary skill in the art will readily appreciate that the current doublers can have different structures without departing from the scope of the invention.

In any event, in the preferred embodiment, each current doubler 30, 40 includes two inductors 32-35, and two diodes 36-39. The inductors 32-35 in each current doubler 30, 40 are connected to opposite terminals of a respective one of the secondary windings 12, 14 of the transformer 16. In other words, each of the inductors 32, 33 in current doubler 30 is connected to an opposite one of the terminals of secondary winding 14; and each of the inductors 34, 35 of current doubler stage 40 is connected to an opposite terminal of secondary winding 12. This arrangement ensures that inductors 32, 34 charge and discharge on opposite half cycles of the ac input signal than inductors 33, 35.

In order to rectify the output of each current doubler stage 30, 40, each of the inductors 32-35 is respectively connected to a diode 36-39. The diodes 36-39 provide rectification by permitting current flow in only one direction.

As shown in FIG. 1, the outputs of the diodes 36-39 of each current doubler 30, 40 are coupled together to form a single output for each doubler 30, 40. In the embodiment shown in FIG. 1, the output of current doubler 30 is connected to the inductors 34, 35 of current doubler 40 such that the two current doublers 30, 40 are connected in series. The output of current doubler 40 is then filtered by a capacitor 48 acting as a low pass filter and output as the dc output of the rectifying circuit 10.

Those of ordinary skill in the art will appreciate that each of the current doubler stages 30, 40 is termed a "current doubler" because the current from the discharging inductor 32-35 in any given half cycle is added to the current from the transformer 16 thereby effectively doubling the current output by each stage 30, 40.

In the preferred embodiment, the diodes 36-39 in each current doubler 30, 40 comprise Schottky diodes. The use of current doublers 30, 40 permits utilization of Schottky diodes in a rectification circuit having a dc output as high as 48–60 volts without encountering adverse effects from the peak inverse voltage limitations associated with those diodes because the ac voltage presented to the diodes 36-39 is preferably maintained within acceptable ranges at all times. In other words, although connecting current doubler 40 in series with current doubler 30 ensures that doubler 40 is biased to a higher base dc voltage than doubler 30, the ac voltage changes processed by doubler 40 falls within the same range as the ac voltage changes processed by doubler 30. This results from the fact that the secondary windings 12, 14 of the transformer 16 dictate the peak to peak limits of the ac signal regardless of the biasing dc voltage experienced by the doublers 30, 40.

Figure 2:
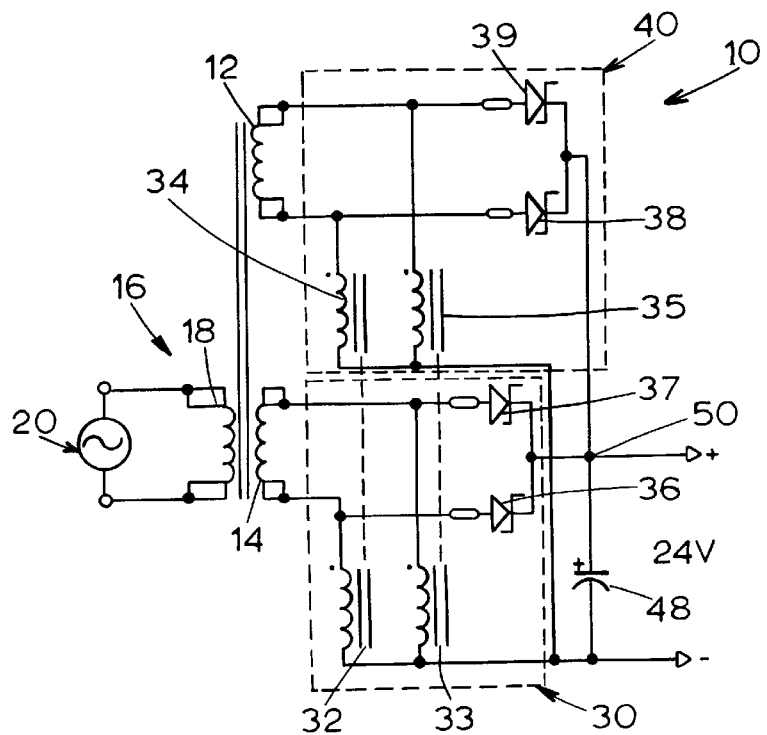
FIG. 2 is a schematic illustration of a second rectifying circuit constructed in accordance with the teachings of the instant invention.

In accordance with a further aspect of the invention, the current doublers 30, 40 of the inventive rectifying circuit 10 can be connected in parallel. Such an approach is shown in FIG. 2. As the approaches of FIG. 1 and FIG. 2 share much of the same structures, like structures have been identified with like reference numerals in FIGS. 1 and 2. In the interest of brevity, descriptions of those corresponding structures will not be repeated. Rather, the following description focuses on the differences between the embodiments shown in FIGS. 1 and 2.

As shown in FIG. 2, the parallel approach differs from the approach shown in FIG. 1 in that, rather than connecting the output of current doubler 30 to the inductors 34, 35 of current doubler 40, the outputs of the doublers 30, 40 are connected at a single node 50 which, after filtering by capacitor 48, forms the output of the rectifying circuit 10. As also shown in FIG. 2, the inductors 34, 35 of current doubler 40 are connected to ground, like the inductors 32, 33 of current doubler 30.

While the preferred embodiment shown in FIG. 1 will produce a dc output of approximately 48 volts for a suitable input, the preferred embodiment shown in FIG. 2 will produce a dc output of 24 volts at twice the current rating of the FIG. 1 circuit, if, other than the series/parallel difference, all other parameters are the same. In other words, when the current doublers 30, 40 are connected in parallel as shown in FIG. 2, the rectifying circuit 10 will produce an output having one-half the voltage and twice the current rating of the series connected embodiment illustrated in FIG. 1. Thus, if the doublers 30, 40 would combine to produce an output voltage in the 48–60 volt range in the series embodiment, connecting those same doublers 30, 40 in parallel would result in an output in the 24–30 volt range at twice the current rating.

In order to reduce part counts and expenses, in the preferred embodiments the inductors 32, 34 in the current doublers 30, 40 comprise a coupled winding on a shared core as shown by the dotted lines in FIGS. 1 and 2. As also illustrated in those figures, inductors 33, 35 of the current doublers 30, 40 also preferably comprise a coupled winding on a shared core. In addition to the savings and size benefits associated with parts count reductions, the coupled winding approach also ensures balance of the winding and diode voltages within the two current doublers 30, 40.

In view of the foregoing, persons of ordinary skill in the art will readily appreciate that an improved rectifying circuit which enables the use of Schottky diodes having peak inverse voltages of only 100 volts while producing an output as high as approximately 60 volts dc has been disclosed.

Furthermore, those skilled in the art will further appreciate that, although the invention has been described in connection with certain embodiments, there is no intent to limit the invention thereto. On the contrary, the intention of this application is to cover all modifications and embodiments fairly falling within the scope of the appended claims either literally or under the doctrine of equivalents.

What is claimed is:

1. For use with a transformer having a primary and two secondary windings, a rectifying circuit comprising:
    a first current doubling circuit connected to a first one of the secondary windings of the transformer, the first current doubling circuit including a first inductor connected to a first terminal of the first secondary winding and a second inductor connected to a second terminal of the first secondary winding; and,
    a second current doubling circuit connected to a second one of the secondary windings of the transformer, the second current doubling circuit including a third inductor connected to a first terminal of the second secondary winding and a fourth inductor connected to a second terminal of the second secondary winding, wherein the first inductor and the third inductor comprise a first coupled winding, the second inductor and the fourth inductor comprise a second coupled winding, and the first and second current doubling circuits are connected in series.

2. A rectifying circuit as defined in claim 1 wherein the first current doubling circuit further comprises a first diode connected to the first terminal of the first secondary winding, and a second diode connected to the second terminal of the first secondary winding.

3. A rectifying circuit as defined in claim 2 wherein the first and second diodes comprise Schottky diodes.

4. A rectifying circuit as defined in claim 2 wherein the second current doubling circuit further comprises a third diode connected to the first terminal of the second secondary winding, and a fourth diode connected to the second terminal of the second secondary winding.

5. A rectifying circuit as defined in claim 4 wherein the first, second, third, and fourth diodes comprise Schottky diodes.

6. A rectifying circuit as defined in claim 1 wherein the first coupled winding is disposed on a first shared core and the second coupled winding is disposed on a second shared core.

7. A rectifying circuit as defined in claim 2 wherein the first and second diodes have a peak inverse voltage of approximately 100 volts.

8. A rectifying circuit as defined in claim 7 wherein the first and second current doubling circuits combine to develop an output voltage in the range of approximately 48 to 60 volts DC.

9. A rectifying circuit as defined in claim 1 wherein the first and second current doubling circuits combine to develop an output voltage of approximately 48 volts DC.

10. For use with a transformer having a primary and two secondary windings, a rectifying circuit comprising:

a first current doubling circuit connected to a first one of the secondary windings of the transformer, the first current doubling circuit including a first inductor connected to a first terminal of the first secondary winding and a second inductor connected to a second terminal of the first secondary winding; and, a second current doubling circuit connected to a second one of the secondary windings of the transformer, the second current doubling circuit including a third inductor connected to a first terminal of the second secondary winding and a fourth inductor connected to a second terminal of the second secondary winding, wherein the first inductor and the third inductor comprise a first coupled winding, the second inductor and the fourth inductor comprise a second coupled winding, and the first and second current doubling circuits are connected in parallel.

11. A rectifying circuit as defined in claim 10 wherein the first current doubling circuit further comprises a first diode connected to the first terminal of the first secondary winding, and a second diode connected to the second terminal of the first secondary winding.

12. A rectifying circuit as defined in claim 11 wherein the first and second diodes comprise Schottky diodes.

13. A rectifying circuit as defined in claim 11 wherein the second current doubling circuit further comprises a third diode connected to the first terminal of the second secondary winding, and a fourth diode connected to the second terminal of the second secondary winding.

14. A rectifying circuit as defined in claim 13 wherein the first, second, third, and fourth diodes comprise Schottky diodes.

15. A rectifying circuit as defined in claim 10 wherein the first coupled winding is disposed on a first shared core and the second coupled winding is disposed on a second shared core.

16. A rectifying circuit as defined in claim 11 wherein the first and second diodes have a peak inverse voltage of approximately 100 volts.

17. A rectifying circuit as defined in claim 16 wherein the first and second current doubling circuits combine to develop an output voltage in the range of approximately 24 to 30 volts DC.

18. A rectifying circuit as defined in claim 10 wherein the first and second current doubling circuits combine to develop an output voltage of approximately 24 volts DC.

* * * * *